Dec. 14, 1948.  J. A. DORNER  2,456,113
STEP-BY-STEP MOLDING OF EXTENSIVE ARTICLES
Filed Aug. 30, 1946
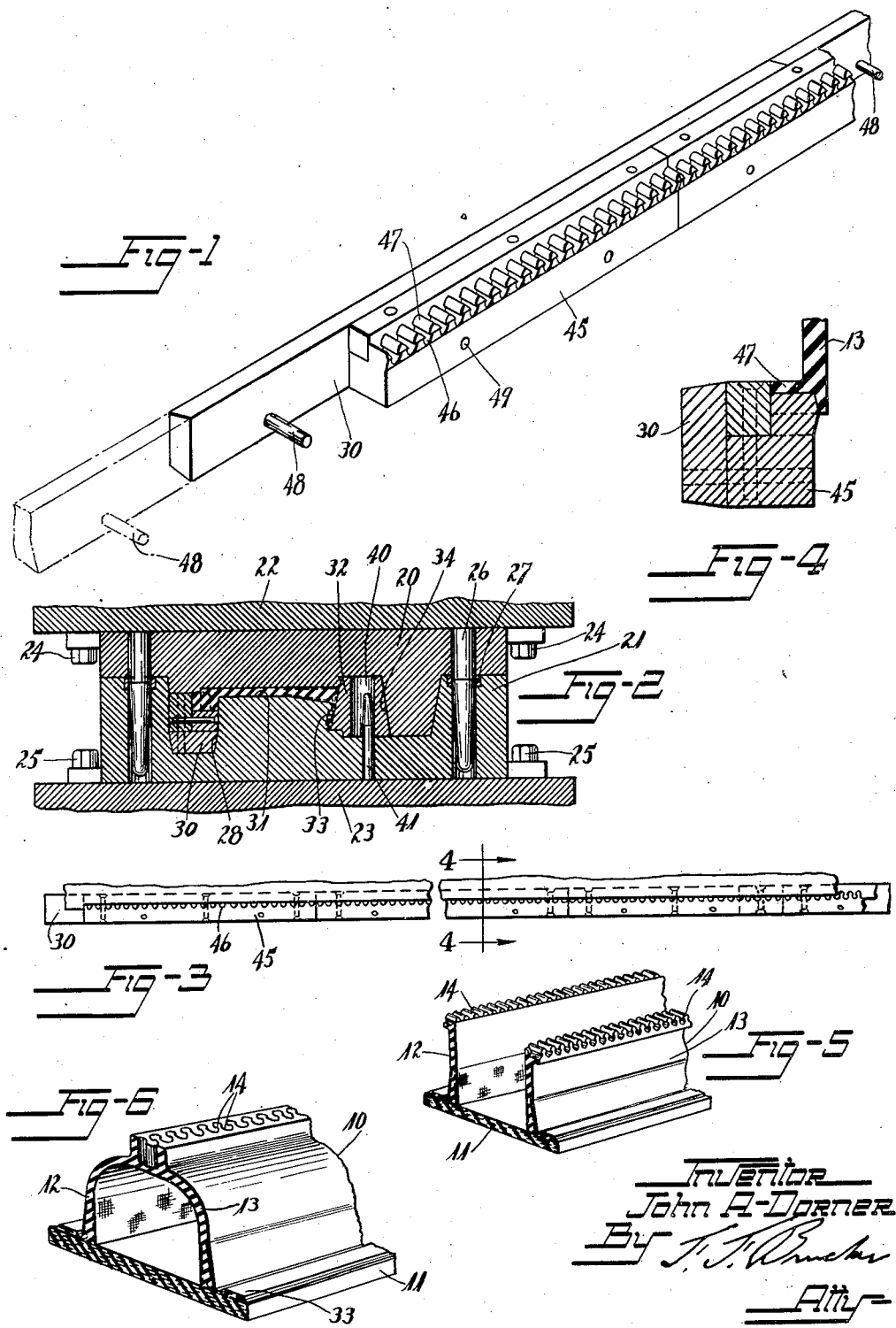
Inventor
John A. Dorner
By
Att'y Patented Dec. 14, 1948

2,456,113

UNITED STATES PATENT OFFICE 2,456,113

STEP-BY-STEP MOLDING OF EXTENSIVE ARTICLES

John A. Dorner, Akron, Ohio, assignor to The B. F. Goodrich Company, New York, N. Y., a corporation of New York Application August 30, 1946, Serial No. 693,943

5 Claims. (Cl. 18—34)

1

This invention relates to the step-by-step molding of extensive strip articles and is especially useful in molding strip articles with notched margins.

Heretofore, in molding extensive strip articles comprising rubber or other rubber-like material and of uniform cross-section, the unvulcanized articles have been vulcanized by drawing them step-by-step between separable mold members having mating through cavities. In former procedures it has been impossible to mold extensive strip articles having dentations or other uniformly spaced projections on their side faces by step-by-step methods without lifting of the strip from the mold before attempting to shift it along the mold and where dentations were molded on the strip during a molding dwell thereof it has been extremely difficult to maintain uniform spacing of the dentations throughout the strip especially where the cures overlap.

The present invention aims to overcome the foregoing and other difficulties.

Objects of the invention are to provide accurate spacing of projections to provide uniformity of construction, and to provide efficient procedure.

A more specific object is to provide for step-by-step molding of an extensive article having determinately spaced projections therealong while maintaining the desired spacing of the projections.

These and other objects will appear from the following description and the accompanying drawings.

Of the drawings,

Fig. 1 is a perspective view of the removable portions of a mold structure constructed in accordance with and embodying the invention, parts being broken away.

Fig. 2 is a cross sectional view of the complete mold with an article therein, parts of the molding press being shown.

Fig. 3 is a plan view of a portion of the molded article overlying the removable molding bars, other portions of the article being broken away.

Fig. 4 is a sectional view thereof taken on line 4—4 of Fig. 3.

Fig. 5 is a perspective view of a zipper belt having parts made in accordance with the invention, the belt being shown in the open position.

Fig. 6 is a similar view showing the belt in the closed position.

Referring to the drawings and first to Figs. 5 and 6 thereof, these show a portion of a conveyor belt 10 made of flexible material and having a flat base 11 and sides 12, 13 connected to the base, the outer edges of the sides being formed with interlocking dentations 14 of flexible material. Such a belt is shown in U. S. Patent No.

2

2,365,762. In the manufacture of such a belt, the base and side portions are made separately and then sewed or otherwise joined together. The present invention is directed to the manufacture of the toothed side portions or similar articles of extensive length and the belt is shown to illustrate an example of an article formed by the apparatus and procedure of this invention. As the dentations 14 must be accurately formed and equally spaced apart, this article presents a difficult problem where due to its extensive length it must be molded step-by-step.

For molding an extensive toothed article such as the side of a belt like that of Figs. 5 and 6, a pair of mold plates 20, 21 of great length are secured to the upper and lower heated platens 22, 23 respectively of a hydraulic press, as by bolts 24, 25. The mold plates are provided respectively with dowel pins 26 and interfitting dowel bushings 27 to align them with each other. Mold plate 21 is formed with a groove 28 extending throughout its length and open at the ends of the plate for receiving a mold bar 30 slideably seated therein for forming the toothed portion of the article. This groove is a continuation of a through cavity 31 formed between the mold plates for forming the web portion of the article and for also receiving a mold bar 32 for molding the offset base 33 of the strip article.

As the offset base meets the side wall at an acute angle, the upper mold plate is formed with an oppositely inclined side face 34 and the bar 32 has a complementary face permitting the bar 32 to move laterally to the right as seen in Fig. 2 as the mold is opened and to be forced to the left in closing the mold. To prevent endwise movement of the bar 32, it is formed with slots 40 of oval cross-section to receive dowel pins 41 fixed to the lower plate, the slots extending with their longer axis of cross section laterally of the mold.

For forming the teeth on the article, the bar 30 which is longer than the mold is provided with detachable tooth-molding members 45 each formed with equally spaced notches 46 for forming the teeth separated by teeth 47 for forming the notches in the strip. Each member 45 is in length a multiple of the linear pitch of the teeth and the notches and teeth are so arranged that the members when interchangeably placed end to end provide a continuous molding surface having uniformly spaced spaces and teeth. The tooth molding members are each of the same length and are each formed with similar dowel holes 49 for engaging over dowel pins 48 carried by the bars 30.

A plurality of similar bars 30 are provided and the dowel pins 48 are evenly spaced therealong, the first and last dowel pin in each bar being arranged at half the distance from the near end of the bar as to the center distance from dowel-to-dowel along the bar. The arrangement is such that a portion of a bar beyond the last tooth-forming member thereon provides room for placing another tooth-forming member engaging the last dowel pin on the bar and the first dowel pin on a succeeding bar for providing a continuous tooth-molding surface spanning the abutting ends of the two bars.

In use of the apparatus, the first bar 30 is placed in the mold and extends entirely therethrough. Tooth-molding members 45 are secured thereto throughout the length of the mold plates. A strip of prepared unvulcanized material comprising rubber or other rubber-like material and reinforcing fabric or cords is laid between the mold plates, the press is closed and molds and vulcanizes a portion of the strip. The press is then opened and the strip together with the bar 30 and its attached tooth-molding members is advanced along the mold plate. The second bar 30 is placed end-to-end with the first bar 30 and connected thereto by a tooth-molding member and a second portion of the strip is vulcanized. As the first bar 30 advances entirely beyond the mold plate it is removed and secured to the second bar at the trailing end thereof. Some overlap of the pressing operation is desirable to avoid mold marks on the article and any desired overlap of pressing operations is possible with the apparatus.

While the invention has been descibed as applied to the manufacture of a belt strip having a toothed margin other articles having determinately spaced projections may be made in the same manner. The invention provides for uniform and accurate spacing of the projections where that is desired.

Variations may be made without departing from the scope of the invention as it is defined by the following claims.

I claim:

1. Apparatus for forming an extensive flexible strip article comprising rubber-like material and having determinately longitudinally spaced projections, said apparatus comprising separable mold plates defining a through cavity therebetween. said cavity including a bar-receiving groove, a bar slideable along and fitting said groove for supporting projection-molding members, projection-molding members seated on said bar in end-to-end relation, said members being interchangeably mounted on said bar, and said bar and said members having end portions non-coincidental to provide an end portion of one extending beyond an end portion of the other.

2. Apparatus for forming an extensive flexible strip article comprising rubber-like material and having determinately longitudinally spaced projections, said apparatus comprising separable mold plates defining a through cavity therebetween, said cavity including a bar-receiving groove, a plurality of bars slideable along and fitting said groove for supporting projection-molding members, projection-molding members seated on said bars in end-to-end relation, said members being interchangeably mounted on said bars, said bars and said projection-molding members being arranged and adapted to overlap each other at the ends of the bars to connect succeeding bars to each other.

3. Apparatus for forming an extensive conveyor belt article having determinately longitudinally spaced interlocking teeth, said apparatus comprising separable mold plates defining a through cavity of uniform cross-section therebetween, said cavity including a bar receiving groove in one of said plates, a plurality of bars interchangeably fitting said groove for supporting tooth-molding members, and slideable along said groove, and projection molding members adapted to be seated on said bars in end-to-end relation for collectively forming a tooth-molding surface, said tooth-forming members being removeably secured to said bars and being adapted to span abutting ends of the bars to connect said bars to each other in series and each tooth-forming member being interchangeably positionable along said series of bars.

4. Apparatus for forming an extensive conveyor belt article having determinately spaced interlocking teeth along a margin thereof, said apparatus comprising separable mold plates defining a through cavity of uniform cross-section therebetween, said cavity including a bar-receiving groove in one of said plates for interchangeably seating bars for supporting tooth-molding members, a plurality of bars interchangeably fitting said groove and slideable therealong, and projection molding members adapted to be seated on said bars in end-to-end relation for collectively forming a tooth-molding surface, said tooth-forming members being removeably secured to said bars and being adapted to span abutting ends of the bars within the confines of said molding members to connect said bars to each other in series and each tooth-forming member being interchangeably positionable along said series of bars, the means for securing said tooth-forming members to said bars comprising dowels arranged along said bars at uniform intervals with intervals of half said uniform intervals between the dowels nearest the ends of the bars and the corresponding ends of the bars.

5. The method of molding an extensive article having determinately spaced apart projections which comprises providing a mold of separable plates having a through cavity of uniform cross section therebetween, providing a bar slideably mounted in a groove of said cavity, mounting projection-forming members on said bar, placing a strip of moldable material between said plates, molding said strip between the plates, advancing the strip and the bar along said mold, removing such projection-forming members as have been advanced beyond the mold plate, placing a second bar with its leading end adjacent the trailing end of the first bar, mounting the removed projection molding members in succession on the trailing end of the series of bars to provide a continuation of the projection molding surface, and molding the strip step by step as it is advanced.

JOHN A. DORNER.

REFERENCES CITED

The following references are of record in the file of this patent:

UNITED STATES PATENTS

| Number | Name | Date |
|---|---|---|
| 1,342,127 | Mellen | June 1, 1920 |
| 2,074,368 | Corner | Mar. 23, 1937 |
| 2,297,017 | Overman | Sept. 29, 1942 |